R. E. HELLMUND.
CONTROL SYSTEM.
APPLICATION FILED MAR. 13, 1916.
1,276,911. Patented Aug. 27, 1918.
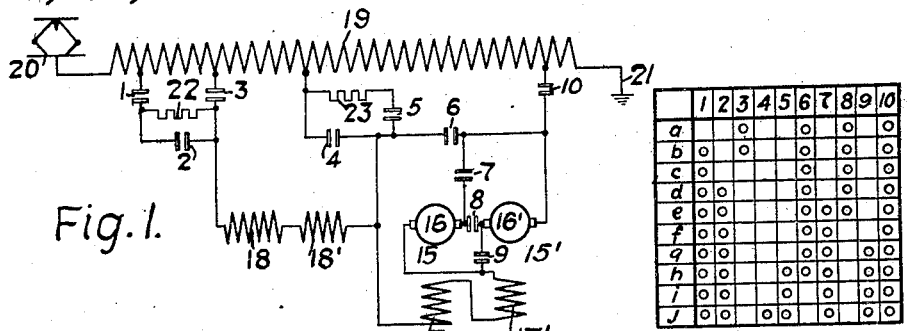
Fig. 1.   Fig. 3.   Fig. 2.
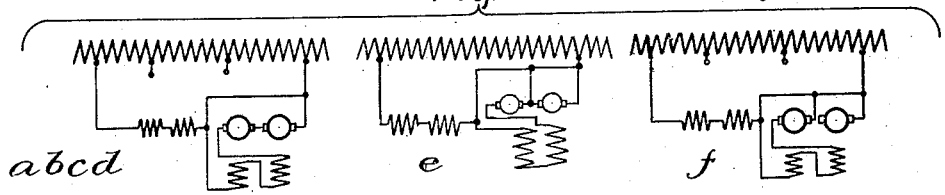
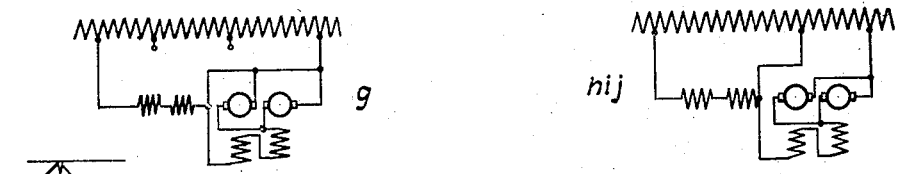
Fig. 4.   Fig. 5.
Fig. 6.
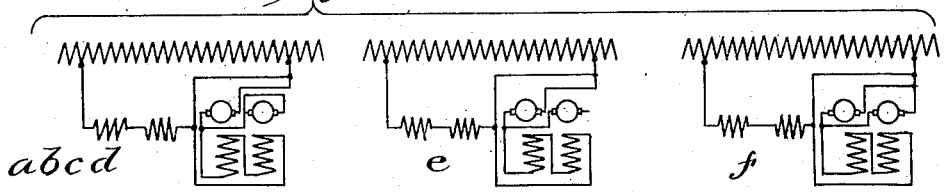
WITNESSES:
R. J. ...
D. C. Davis.
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,276,911.          Specification of Letters Patent.      Patented Aug. 27, 1918.

Application filed March 13, 1916. Serial No. 83,777.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems, of which the following is a specification.

My invention relates to systems of control for alternating-current motors of the commutator type, and it has for its object to provide a system whereby motors of the character designated may be accelerated in a smooth and uniform manner with favorable torque characteristics and with absence of commutation difficulties.

In the accompanying drawing, Figure 1 is a diagrammatic view of two alternating-current motors of the compensated commutator type, together with their attendant supply and control circuits embodying a preferred form of my invention; Fig. 2 is a sequence chart setting forth the order of switch operation in the system of Fig. 1 when operating in accordance with my invention; Fig. 3 is a group of simplified diagrammatic views of the circuit of Fig. 1 showing the development of the connections therein when the switches thereof are manipulated in accordance with the chart of Fig. 2; Fig. 4 is a diagrammatic view of a modification of the system shown in Fig. 1; and Fig. 5 is a sequence chart setting forth the preferred order of switch operation in the circuit of Fig. 4; and Fig. 6 is a view similar to Fig. 3 and relating to the system of Fig. 4.

In the operation of an alternating-current motor of the commutator type, it is desirable, at low speeds, especially when accelerating a heavy load, to weaken the energization of the main or exciting field winding in order to reduce the transformer action thereof on the short circuited coils undergoing commutation and thus to improve the commutation. In the present application, I show means adapted to this end and susceptible of application only to a system wherein a plurality of motors are to be simultaneously started and operated. Briefly speaking, the present system comprises means for initially energizing the main or exciting field windings of a plurality of motors, in a system of the character designated, by the armature current of but a single motor and for subsequently energizing all of said main or exciting field windings by the sum of the armature currents of more than one of said motors.

Referring to the accompanying drawing for a more detailed understanding of my invention, I show two motors of the compensated, commutator type at 15 and 15' in Fig. 1, said motors comprising armatures 16 and 16', main or exciting field windings 17 and 17', and cross or compensating field windings 18 and 18'. Energy for the operation of the motors 15 and 15' may be derived from any suitable source, such, for example, as an auto-transformer 19 connected between the trolley 20 and the ground connection 21 of an alternating-current railway vehicle. The voltage applied to the compensating field winding may be adjusted by the operation of suitable switches 1 to 3, inclusive, and of a preventive device 22, and, in like manner, the voltage applied through an intermediate or double-feed tap may be adjusted by manipulating suitable switches 4 and 5 and a preventive device 23. The brushes of one polarity on the armature 16 may be connected to a brush set of the armature 16' through a switch 8 and, when thus connected, the armatures may be short circuited through the exciting field windings 17 and 17' by the closure of a suitable switch 6. The armature 16 may be connected directly to the line by the closure of a switch 7 and the armature 16' may be connected to the exciting field winding 17' through a switch 9.

Having thus described the arrangement of a system embodying my invention, the accelerating operation is as follows: At the outset, a relatively small motor voltage and exciting field current is desired and, accordingly, the switches 3, 6, 8 and 10 are closed, as indicated in the position $a'$ of Fig. 2 and immediately thereafter, the switches 1, 2 and 3 are manipulated to raise the motor voltage on the outer cross field tap, resulting in the connections shown in Fig. $3^{abcd}$. The two armature windings are connected in series relation and are together short circuited through the exciting field windings, also connected in series relation, and the compensating field windings are connected across a portion of the source. As a result, the motors 15 and 15' start as transformer motors with stator excitation motors, and each exciting field winding is energized by the armature current of one motor. The switches 7 and 8 are then manipulated to establish the connections shown in Fig. 3$^{ef}$.

The armature 16' is temporarily disconnected and the armature 16 is short circuited through the exciting field windings, whereby the imposition of the entire load upon the armature 16 increases the current thereof and, accordingly, the excitation of the exciting field windings. The switch 9 is next closed, establishing the connections shown in Fig. 3$^g$, the two armature windings being connected in parallel and the parallel combination being short circuited through the two exciting field windings, connected in series relation, whereby each of the main field windings receives the total or joint current of the two armatures. Finally, the switches 4, 5 and 6 are manipulated to establish a mid-tap and to effect the transition from pure transformer operation to doubly-fed operation, resulting in the circuit shown in Fig. 3$^{hij}$, wherein the exciting field windings are connected in series relation with each other and thus arranged to receive the joint current of both armature windings, a condition which is satisfactory for many conditions of full speed operation, although, as is well recognized in the art; in order to obtain still higher accelerating speeds, it may be necessary to again weaken the excitation of the exciting field windings.

Referring now to the form of my invention shown in Fig. 4, the general arrangement of motors and of supply circuits is the same as shown in Fig. 1 and, at the outset, switches 3, 6, 7 and 11 are closed, whereupon, a relatively low voltage is impressed upon the outer compensating-field terminal, the armature 16 is short circuited through the two exciting field windings and the armature winding 16' is short circuited upon itself. Thus, pure transformer operation is initiated and all excitation for the exciting field windings is derived from the armature 16. The low torque developed by the armature 16, because of its highly inductive short circuit, is compensated for by the fact that the armature 16' is directly short circuited and, hence, is subject to deliver a high torque. The switches 1, 2 and 3 are then manipulated to raise the compensating field voltage as shown in steps $b$ and $c$ and $d$ in Fig. 5, and the armature 16' is then introduced into circuit by opening the switch 11 and closing the switch 10, whereupon, the two armatures are connected in parallel and together are short circuited through the exciting field windings connected in series relation. The switches 4 and 5 are then closed and the switch 6 is opened, whereupon, the transition is made to doubly-fed operation with the connections as shown in the final step of Fig. 1.

While I have shown and described my invention in two of its preferred forms, it is not so limited but is susceptible of various minor changes and modifications without departing from the spirit thereof and I desire, therefore, that only such limitations shall be placed thereupon as are imposed by the prior art or indicated in the appended claims.

I claim as my invention:

1. The combination with a source of alternating currents, of a plurality of commutator-type motors, means for initially energizing the exciting field windings of said motors by the armature current of a portion of said motors, and means for subsequently energizing said exciting field windings by the sum of the armature currents of a greater number of said motors.

2. The combination with a source of alternating currents, of a plurality of compensated, commutator motors each of which is provided with exciting and compensating field windings, means for initially energizing said exciting field windings by the armature current of a portion of said motors, and means for subsequently energizing said exciting windings by the sum of the armature currents of a greater number of said motors.

3. The combination with a source of alternating currents, of a plurality of compensated, commutator motors, means for initially energizing the exciting field windings of said motors by the armature current of a portion of said motors, means for connecting the compensating field windings of said motors across a portion of said source, means for subsequently energizing said exciting field windings by the sum of the armature currents of a greater number of said motors, and means for finally energizing said exciting field windings by the sum of the armature currents of said greater number of motors and for energizing said compensating field windings by a predetermined portion of said joint armature current.

4. The method of operating a plurality of motors of the commutator type from a source of alternating current which comprises initially energizing the exciting field windings of said motors by the armature current of a portion of said motors, and subsequently energizing said exciting field windings by the sum of the armature currents of a greater number of said motors.

5. The method of operating a plurality of motors of the compensated commutator type from a source of alternating current which comprises initially energizing the exciting field windings of said motors by the armature current of a portion of said motors and subsequently energizing said exciting field windings by the sum of the armature currents of a greater number of said motors.

6. The method of operating a plurality of motors of the compensated, commutator type from a source of alternating current which comprises initially energizing the exciting field windings of said motors by the armature current of a portion of said motors, subsequently energizing said exciting field windings by the sum of the armature currents of a greater portion of said motors, and finally energizing said exciting field windings by said joint armature current and energizing said compensating field windings by a predetermined portion of said joint armature current.

7. The combination with a source of alternating current, of a plurality of motors of the commutator type provided with exciting and compensating field windings, means for initially connecting the compensating field winding of said motors to said source, for short circuiting the armatures of a portion of said motors through the exciting field windings of all of said motors, and for directly short circuiting the armatures of the remainder of said motors, and means for thereafter permitting the armature currents of a greater number of said motors to flow through all of said exciting field windings.

8. The combination with two motors of the commutator type, of means for short-circuiting the armature of one of said motors, and means for simultaneously energizing the exciting field windings of both of said motors by the armature current of the other motor.

In testimony whereof I have hereunto subscribed my name this 29th day of Feb. 1916.

RUDOLF E. HELLMUND.

Copies of this patent may be obtained for five cents each, by addressing the "Commissioner of Patents, Washington, D. C."